(12) United States Patent
Kasuya et al.

(10) Patent No.: US 11,884,119 B2
(45) Date of Patent: Jan. 30, 2024

(54) VEHICLE BEHAVIOR DEVICE

(71) Applicant: Hitachi Astemo, Ltd., Ibaraki (JP)

(72) Inventors: Kentaro Kasuya, Hitachinaka (JP); Ryusuke Hirao, Hitachinaka (JP); Nobuyuki Ichimaru, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 173 days.

(21) Appl. No.: 17/425,437

(22) PCT Filed: Jan. 8, 2020

(86) PCT No.: PCT/JP2020/000258
§ 371 (c)(1),
(2) Date: Jul. 23, 2021

(87) PCT Pub. No.: WO2020/158314
PCT Pub. Date: Aug. 6, 2020

(65) Prior Publication Data
US 2022/0097473 A1  Mar. 31, 2022

(30) Foreign Application Priority Data
Jan. 28, 2019 (JP) .................. 2019-012341

(51) Int. Cl.
*B60G 17/0165* (2006.01)

(52) U.S. Cl.
CPC ...... *B60G 17/0165* (2013.01); *B60G 2400/60* (2013.01); *B60G 2400/821* (2013.01); *B60G 2500/22* (2013.01)

(58) Field of Classification Search
CPC ............ B60G 17/0165; B60G 2400/60; B60G 2400/821; B60G 2500/22
See application file for complete search history.

(56) References Cited

U.S. PATENT DOCUMENTS

| 9,114,683 B2 * | 8/2015 | Kikuchi | ............. B60G 17/0195 |
| 9,963,006 B2 * | 5/2018 | Kubota | ............. B60G 17/0165 |

(Continued)

FOREIGN PATENT DOCUMENTS

| DE | 102016013703 A1 * | 5/2018 | ......... B60G 17/0162 |
| JP | 4-342612 | 11/1992 | |

(Continued)

OTHER PUBLICATIONS

International Search Report dated Mar. 17, 2020 in International (PCT) Application No. PCT/JP2020/000258, with English translation.

(Continued)

*Primary Examiner* — Toan C To
(74) *Attorney, Agent, or Firm* — Wenderoth, Lind & Ponack, L.L.P.

(57) ABSTRACT

Provided is a vehicle behavior device including: a variable damper, which is provided between a vehicle body side and a wheel side of a vehicle, and is configured to adjust a force to be generated; a camera device configured to measure a road surface state forward of the vehicle; a future vehicle state estimation unit configured to predict a sprung behavior of the vehicle from a road surface displacement acquired by the camera device and a vehicle speed; and a command value calculation unit configured to obtain a force to be generated by the variable damper based on a predicted value obtained by the future vehicle state estimation unit, and output a command signal.

8 Claims, 9 Drawing Sheets

(56) References Cited

U.S. PATENT DOCUMENTS

| | | | | |
|---|---|---|---|---|
| 11,065,931 | B1* | 7/2021 | Keas | B60G 15/061 |
| 11,299,001 | B2* | 4/2022 | Ohno | B60G 17/0157 |
| 11,318,804 | B2* | 5/2022 | Minakuchi | B60W 40/112 |
| 11,351,833 | B2* | 6/2022 | Toyohira | B60G 17/06 |
| 11,560,033 | B2* | 1/2023 | Yamazaki | B62D 35/02 |
| 11,602,970 | B2* | 3/2023 | Goto | B60G 17/0157 |
| 2002/0045977 | A1* | 4/2002 | Uchiyama | B60G 17/01908 280/5.515 |
| 2010/0138108 | A1* | 6/2010 | Kajino | B60G 17/016 701/38 |
| 2010/0204885 | A1* | 8/2010 | Kajino | B60G 21/0555 701/37 |
| 2014/0001717 | A1* | 1/2014 | Giovanardi | B60G 17/0165 280/5.518 |
| 2015/0046035 | A1* | 2/2015 | Kikuchi | B60G 17/0195 701/37 |
| 2017/0166019 | A1* | 6/2017 | Singh | B60C 23/0408 |
| 2017/0274724 | A1* | 9/2017 | Liu | B60G 17/01933 |
| 2017/0320368 | A1* | 11/2017 | Masamura | B60G 17/018 |
| 2018/0079272 | A1* | 3/2018 | Aikin | B60G 17/0195 |
| 2018/0361813 | A1* | 12/2018 | Ohno | B60G 17/0157 |
| 2019/0255903 | A1 | 8/2019 | Hirao et al. | |
| 2019/0263210 | A1* | 8/2019 | Nasu | B60T 8/172 |
| 2019/0337351 | A1 | 11/2019 | Kosaka et al. | |
| 2020/0023705 | A1* | 1/2020 | Hirao | B60G 17/0165 |
| 2021/0379953 | A1* | 12/2021 | Furuta | B60G 17/06 |
| 2021/0387498 | A1* | 12/2021 | Furuta | B60G 17/0165 |
| 2021/0402841 | A1* | 12/2021 | Furuta | B60G 17/08 |
| 2022/0105770 | A1* | 4/2022 | Furuta | B60G 17/056 |
| 2022/0111695 | A1* | 4/2022 | Furuta | B60G 17/0165 |

FOREIGN PATENT DOCUMENTS

| | | | |
|---|---|---|---|
| JP | 7-215032 | | 8/1995 |
| JP | 2010-195323 | | 9/2010 |
| JP | 2017071310 A | * | 4/2017 |
| JP | 2018-114819 | | 7/2018 |
| WO | 2018/061770 | | 4/2018 |

OTHER PUBLICATIONS

Written Opinion of the International Searching Authority dated Mar. 17, 2020 in International (PCT) Application No. PCT/JP2020/000258, with English translation.

* cited by examiner

VEHICLE BEHAVIOR DEVICE

TECHNICAL FIELD

The present invention relates to a vehicle behavior device configured to control a behavior of a vehicle.

BACKGROUND ART

There are known control devices configured to control (preview-control) suspensions in accordance with a road surface state forward of a vehicle (see Patent Literature 1 and Patent Literature 2). In Patent Literature 1, there is disclosed a control device configured to estimate a relative displacement between a vehicle body and a road surface at a forward position and the like, and output command values for optimal forces or strokes to actuators when front wheels reach the forward position. The control device disclosed in Patent Literature 1 stores, in a memory, a road surface state signal at a thinning rate based on the vehicle speed, to thereby suppress an increase in memory capacity caused by an increase in road surface state signal at low speed.

In Patent Literature 2, there is disclosed a control device configured to apply frequency analysis to forward road surface information to calculate a response lag compensation time in accordance with the frequency. In the control device described in Patent Literature 2, it is possible to provide highly precise lag compensation in a wide frequency range.

CITATION LIST

Patent Literature

PTL 1: JP 4-342612 A
PTL 2: JP 7-215032 A

SUMMARY OF INVENTION

Technical Problem

Incidentally, both of the preview control disclosed in Patent Literature 1 and Patent Literature 2 observe recesses and protrusions of the road surface, and control an unsprung portion so as to address the recesses and protrusions. However, an amplitude of a sprung portion excited by the road surface may be different from a road surface amplitude. For example, in the case of a road surface that displaces at a sprung resonant frequency, the sprung vibration tends to be larger than the road surface vibration. Meanwhile, in the case of a road surface that displaces at an unsprung resonant frequency, the sprung vibration tends to be smaller than the road surface vibration. Thus, the preview control described in the above-mentioned technologies has a problem in that sprung control becomes insufficient at low frequency, for example, a frequency close to the sprung resonant frequency.

Solution to Problem

An object of the present invention is to provide a vehicle behavior device capable of predicting a future behavior of sprung vibration from information on a road surface forward of a vehicle, and control a force to be generated by a force generation mechanism.

According to one embodiment of the present invention, there is provided a vehicle behavior device including: a force generation mechanism, which is provided between a vehicle body side and a wheel side of a vehicle, and is configured to adjust a force to be generated; a road surface state acquisition unit configured to acquire a road surface state forward of the vehicle; a vehicle sprung behavior prediction unit configured to predict a sprung behavior of the vehicle from a road surface displacement acquired by the road surface state acquisition unit; and a force generation mechanism control unit configured to obtain a force to be generated by the force generation mechanism based on a predicted value obtained by the vehicle sprung behavior prediction unit, and to output a command signal.

According to one embodiment of the present invention, it is possible to predict a future behavior of sprung vibration from information on the road surface forward of the vehicle, and control the force to be generated by the force generation mechanism.

DESCRIPTION OF EMBODIMENTS

A detailed description is now given with an exemplary case in which a vehicle behavior device according to embodiments of the present invention is applied to a four-wheeled vehicle with reference to the accompanying drawings.

Figure 1:
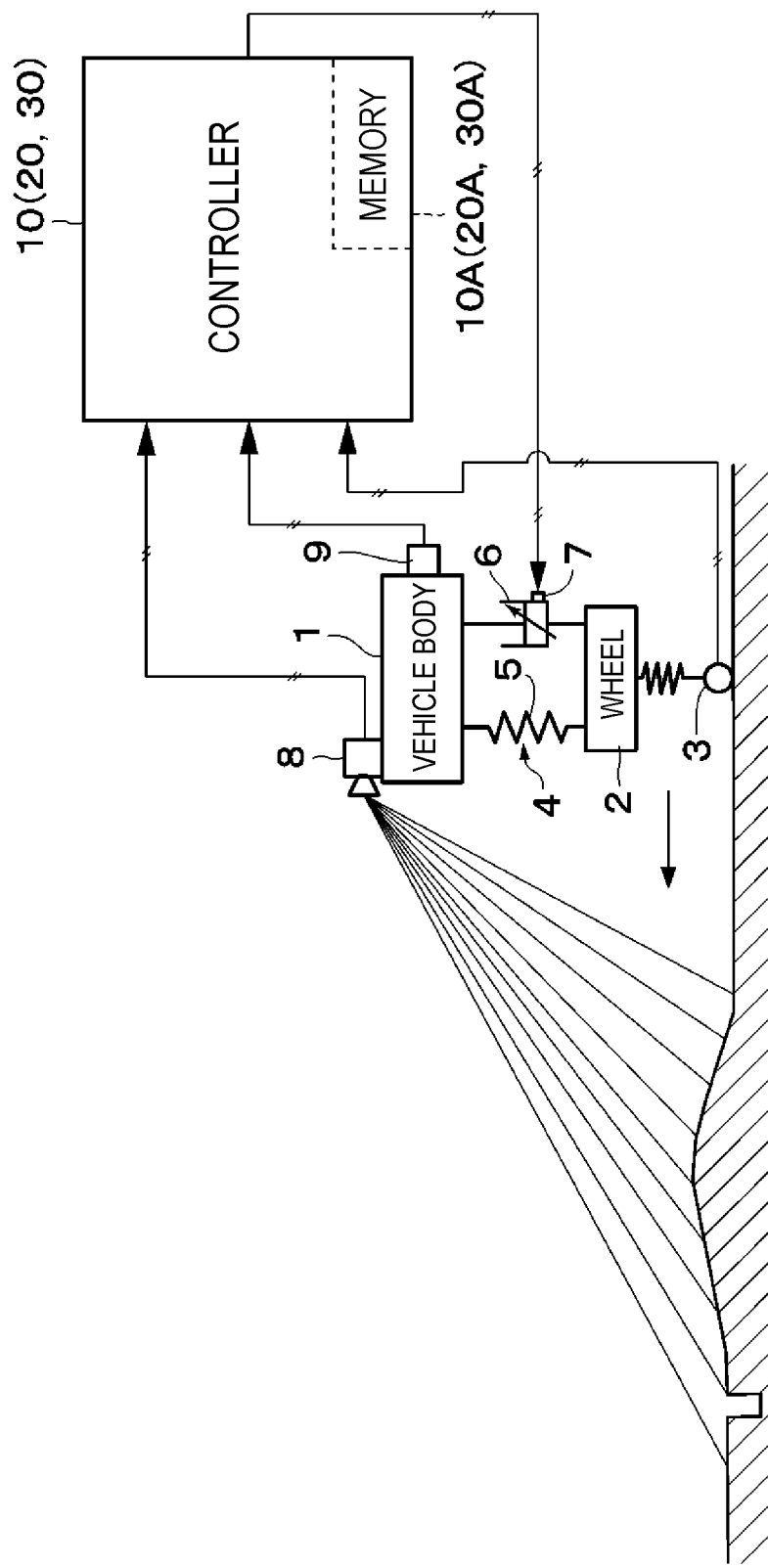
FIG. 1 is an overall configuration diagram for illustrating a vehicle behavior device according to embodiments of the present invention.

In FIG. 1, on a bottom side of a vehicle body 1 forming a body of a vehicle, for example, there are provided left and right front wheels and left and right rear wheels (hereinafter generally referred to as "wheels 2"). Each of those wheels 2 includes a tire (not shown). The tire acts as a spring configured to absorb small recesses and protrusions on a road surface.

Each of vehicle speed sensors 3 detects, for example, the number of revolutions of the wheel 2 (that is, the tire), and outputs the rotation number as vehicle speed (travel speed of the vehicle) information to a controller 10 described below. The controller 10 acquires the vehicle speed based on the vehicle speed information from the vehicle speed sensors 3. In this configuration, the vehicle speed sensors 3 form a vehicle speed detection unit configured to detect or estimate the vehicle speed. The controller 10 does not necessarily acquire the vehicle speed based on the vehicle speed information from the vehicle speed sensors 3, and may acquire the vehicle speed through, for example, a controller area network (CAN).

A suspension device 4 is interposed between the vehicle body 1 and the wheel 2. The suspension device 4 is formed of a suspension spring 5 (hereinafter referred to as "spring 5") and a damping force adjustable shock absorber (hereinafter referred to as "variable damper 6") provided, in a parallel relationship with the spring 5, between the vehicle body 1 and the wheel 2. In FIG. 1, there is schematically illustrated a case in which one set of the suspension device 4 is provided between the vehicle body 1 and the wheel 2. In the case of the four-wheeled vehicle, a total of four sets of the suspension devices 4 are provided individually and independently between the four wheels 2 and the vehicle body 1.

The variable damper 6 of the suspension device 4 is a force generation mechanism configured to generate an adjustable force between the vehicle body 1 side and the wheel 2 side. The variable damper 6 is formed through use of a hydraulic shock absorber of the damping force adjustable type. To the variable damper 6, a damping force variable actuator 7 formed of a damping force adjustment valve or the like is attached in order to continuously adjust a characteristic (that is, damping force characteristic) of the generated damping force from a hard characteristic to a soft characteristic. However, it is not always required that the damping force variable actuator 7 be configured to continuously adjust the damping force characteristic, and may be configured to adjust the damping force at a plurality of levels, for example, two or more levels. Moreover, the variable damper 6 may be of a pressure control type or a flow rate control type.

A camera device 8 forms a road surface state measurement unit (road surface state acquisition unit) provided in a front portion of the vehicle body 1. The camera device 8 measures and detects a road surface state (specifically, including the distance to and the angle with respect to a road surface to be detected and a position and a distance of a screen) forward of the vehicle. The camera device 8 is formed of a stereo camera including a pair of left and right image pickup elements (such as digital cameras) as described in, for example, JP 2011-138244 A. The camera device 8 takes a pair of left and right images, to thereby detect the road surface state including the distance to and the angle with respect to the object to be imaged (the road surface located forward of the vehicle). Thus, a preview image forward of the vehicle (that is, road surface preview information) taken by the camera device 8 is output, as a detection result of the road surface state measurement unit, to the controller 10 described below.

The road surface state measurement unit is not limited to the camera device 8 formed of the stereo camera, and may be a combination of, for example, a millimeter wave radar and a monaural camera, or may be formed of a plurality of millimeter wave radars and the like. Moreover, the road surface state acquisition unit is not limited to the camera device 8, and, for example, may acquire information based on GPS data from a server, or may acquire information from another vehicle through use of vehicle-to-vehicle communication.

A vehicle height sensor 9 detects the height of the vehicle body 1. A plurality of (for example, four) vehicle height sensors 9 are provided, for example, on the vehicle body 1 side being the sprung side in correspondence to the respective wheels 2. That is, each vehicle height sensor 9 detects a relative position (height position) of the vehicle body 1 with respect to each wheel 2, and outputs a detection signal thereof to the controller 10. The controller 10 acquires a vehicle body weight (vehicle body mass) including occupants based on the detection signals obtained from the vehicle height sensors 9 when the vehicle is stopped. In this state, the vehicle height sensors 9 form a vehicle body weight detection unit configured to detect or estimate the vehicle body weight. The vehicle body weight detection unit is not limited to the vehicle height sensors 9, and may be, for example, a weight sensor configured to directly detect the vehicle body weight.

Figure 5:
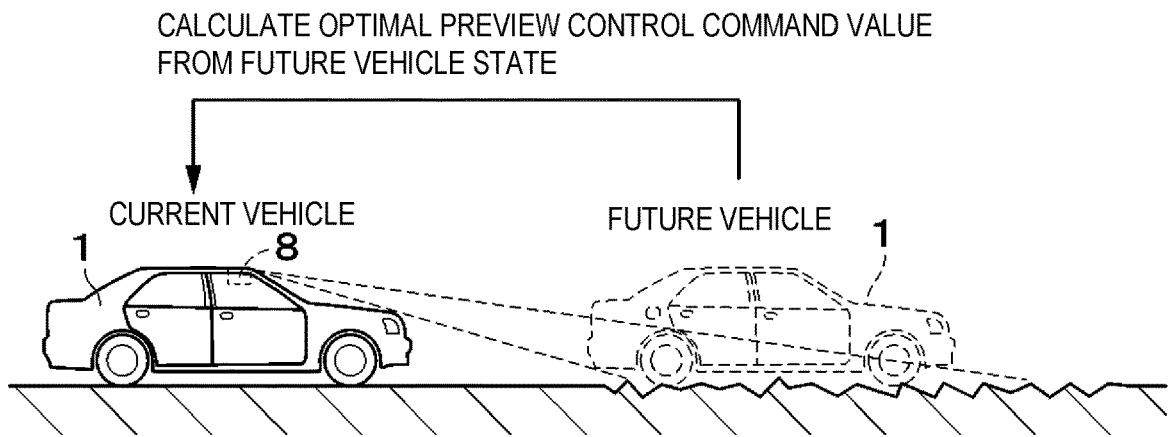
FIG. 5 is an explanatory diagram for illustrating a state in which a preview control command value is calculated from a future vehicle state.

The controller 10 predicts the sprung behavior of the vehicle from the road surface displacement (detected road surface displacement) acquired from the camera device 8. The controller 10 obtains forces to be generated by the variable dampers 6 (force generation mechanisms) of the suspension devices 4 based on a predicted value (for example, a future sprung speed) of the sprung behavior, and outputs command signals of the forces to the damping force variable actuators 7 of the suspension devices 4. The controller 10 is mounted to the vehicle body 1 side of the vehicle as a control device configured to execute behavior control including posture control of the vehicle and the like. The controller 10 variably controls the damping force to be generated by the variable damper 6 in accordance with a command value described below based on the detection signal (image signal including the road surface information) from the camera device 8 (see FIG. 5).

Thus, an input side of the controller 10 is connected to the vehicle speed sensors 3, the vehicle height sensors 9, and the camera device 8, and an output side thereof is connected to the damping force variable actuators 7 of the variable dampers 6. To the controller 10, the camera-measured road surface displacement (road surface preview information) is input from the camera device 8. To the controller 10, the vehicle speed is input from the vehicle speed sensors 3. Moreover, to the controller 10, there is input vehicle characteristic information such as a vehicle body mass (sprung mass "mb"), an unsprung mass "mt", a spring constant "ks" of the suspension spring between the vehicle body and the unsprung portion, a tire spring constant "kt", and the like that influence a vehicle body motion. The vehicle characteristic information may be stored in a memory as fixed values. Moreover, in consideration of a change in the vehicle characteristics, the vehicle characteristic information in the controller 10 may be rewritten always, periodically, from time to time, or through manual input by, for example, obtaining the vehicle body mass from the vehicle height sensors 9.

Moreover, the controller 10 is formed through use of, for example, a microcomputer. The controller 10 includes a memory 10A formed of, for example, a ROM, a RAM, and/or a nonvolatile memory. In the memory 10A, there is stored a program for variably controlling the damping force to be generated in each variable damper 6, and there are further stored the preview information on the road surface forward of the vehicle taken by the camera device 8 and the like in an updatable manner.

Figure 2:
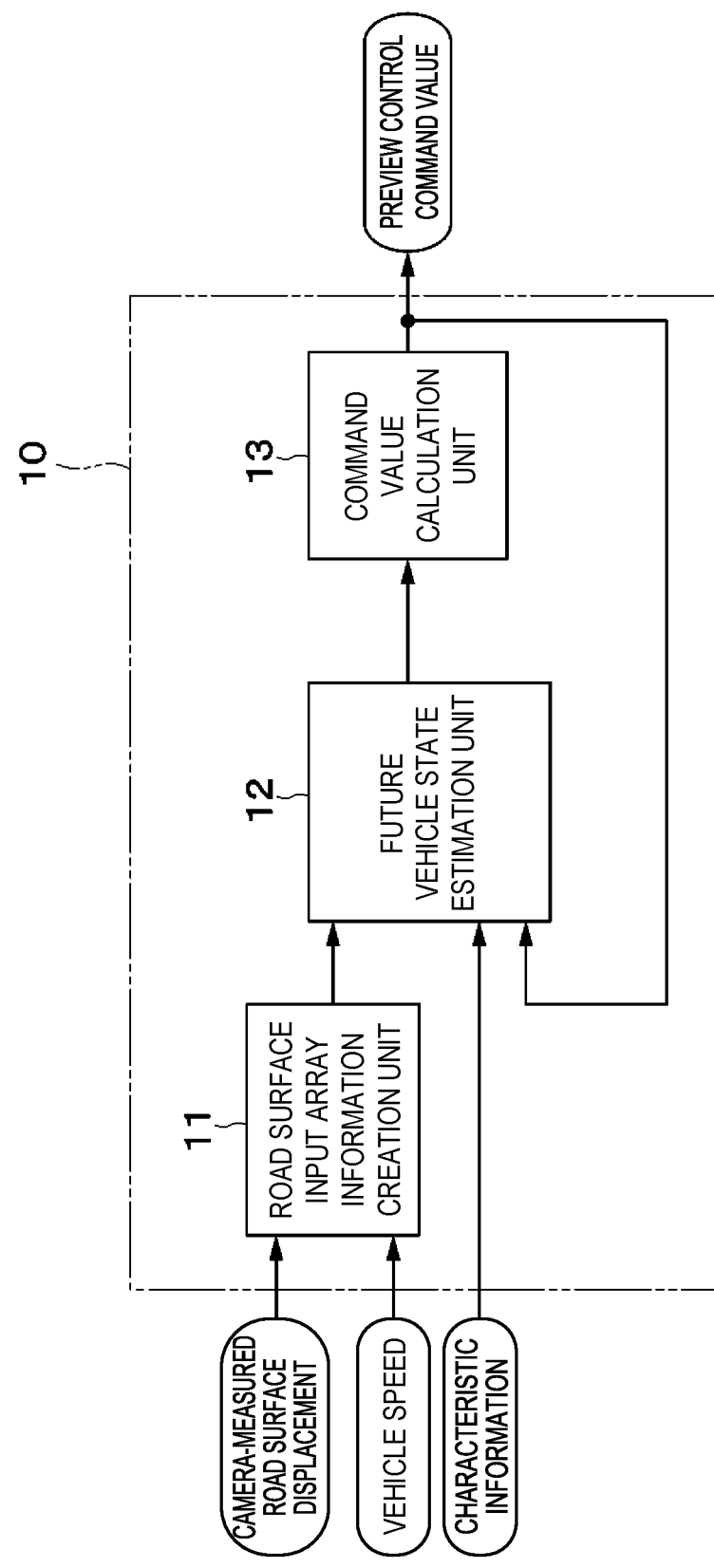
FIG. 2 is a control block diagram for illustrating a controller of FIG. 1.

As illustrated in FIG. 2, the controller 10 includes a road surface input array information creation unit 11. To the road surface input array information creation unit 11, there are input the road surface displacement (detected road surface displacement) acquired from the camera device 8 and the vehicle speed acquired from the vehicle speed sensors 3. The road surface input array information creation unit 11 creates road surface input array information in consideration of the vehicle speed as the road surface displacement information based on the camera-measured road surface displacement and the vehicle speed.

Figure 3:
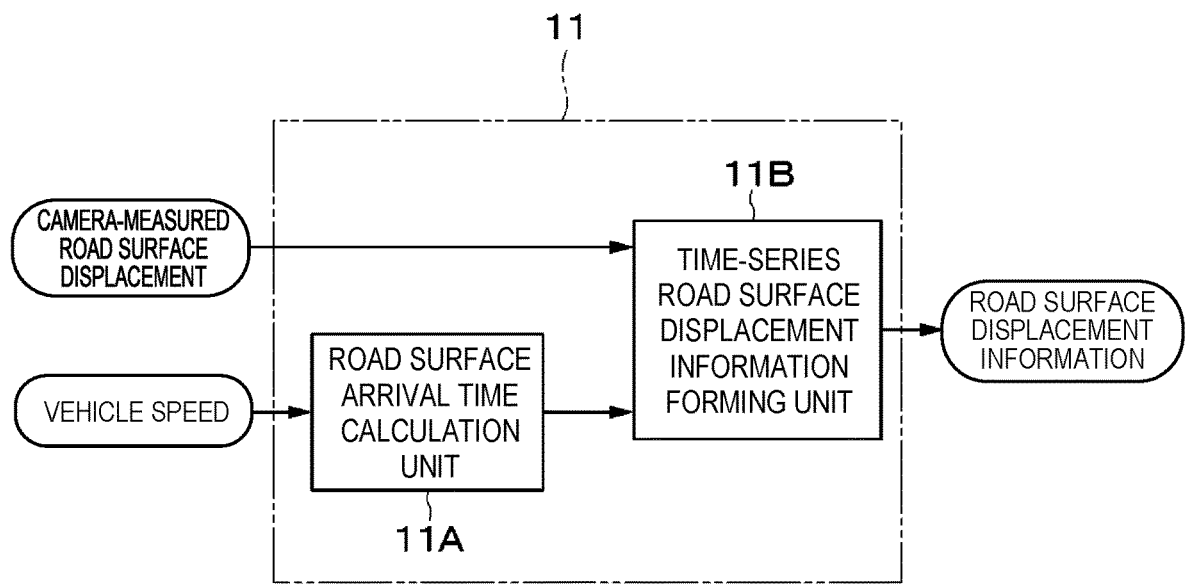
FIG. 3 is a control block diagram for illustrating a road surface input array information creation unit of FIG. 2.
Figure 6:
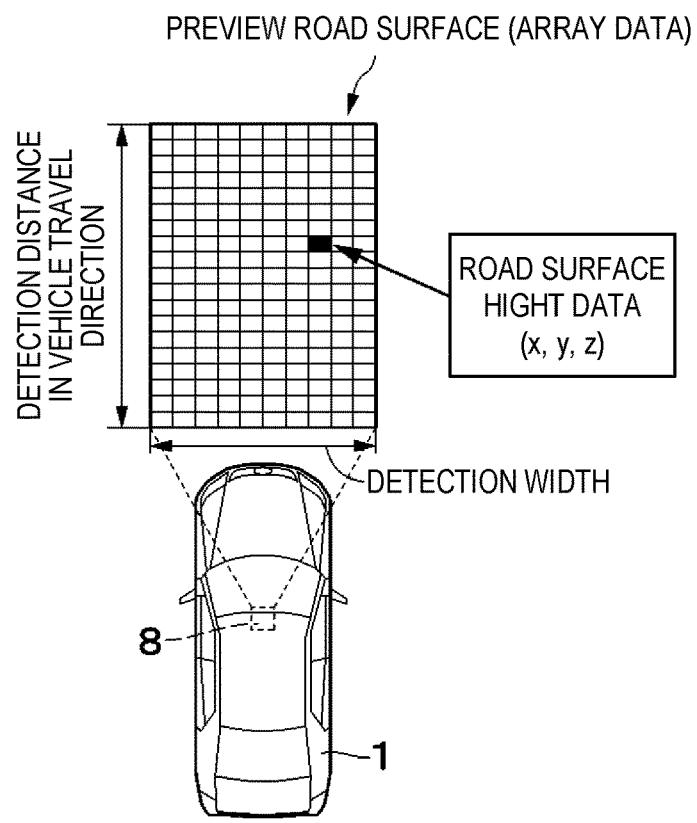
FIG. 6 is an explanatory diagram for illustrating a state in which array data is formed based on a camera-measured road surface displacement.

As illustrated in FIG. 3, the road surface input array information creation unit 11 includes a road surface arrival time calculation unit 11A and a time-series road surface displacement information forming unit 11B. As illustrated in FIG. 6, the road surface input array information creation unit 11 forms array data (preview data) formed of the position and the height of a freely-selected section in the travel direction of the vehicle based on the road surface preview information (camera-measured road surface displacement) output from the camera device 8. Specifically, the road surface arrival time calculation unit 11A calculates a road surface arrival time "t" from the maximum distance L of the detected road surface and the vehicle speed V. The time-series road surface displacement information forming unit 11B forms data (road surface displacement information) on a future road surface displacement as a time series based on the road surface arrival time and the camera-measured road surface displacement from the camera device 8. The time-series road surface displacement information forming unit 11B outputs, as the road surface displacement information, data on the future road surface displacement in the time series. As a result, the road surface displacement information is converted to a form that can be used to calculate the future vehicle state estimation.

For example, when L is the maximum distance for the vehicle to detect with the preview function, and the time until the own vehicle arrives at the detected road surface is "t", the road surface displacement information is time array data w(t) being "n" pieces of height information. In this configuration, as given by Expression 1, the time "t" is a value obtained by dividing the maximum distance L by the vehicle speed V. The value "n" is a value obtained by dividing the time "t" by a sampling time ST (n=t/ST). As a result, as given by Expression 2, there is obtained, as the preview data, the time array data w(t) on the height information being a function of the time. When the vehicle speed V is low, the time array data w(t) is road surface displacement information at low frequency. When the vehicle speed V is high, the time array data w(t) is road surface displacement information at high frequency. That is, the time-series road surface displacement information is information (road surface displacement information) input from the road surface having a frequency component and a displacement component.

$$t = L/V \quad \text{[Expression 1]}$$

$$w = w(t) \quad \text{[Expression 2]}$$

Figure 4:
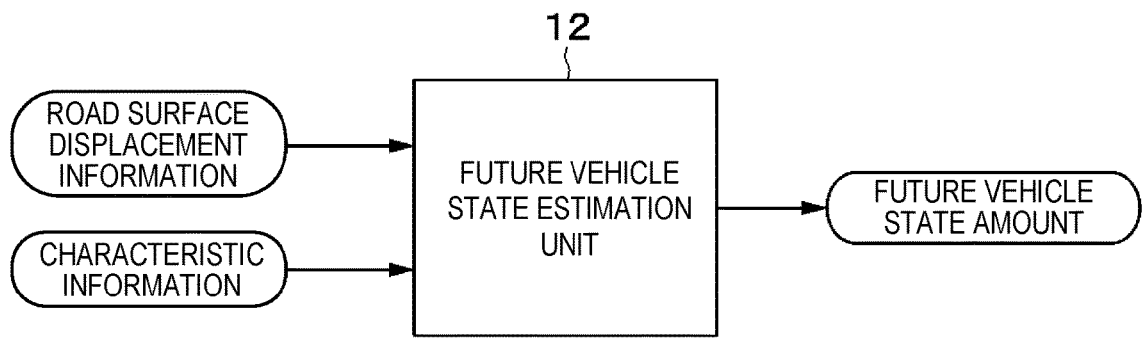
FIG. 4 is a control block diagram for illustrating a future vehicle state estimation unit of FIG. 2.

The controller 10 includes a future vehicle state estimation unit 12 and a command value calculation unit 13. As illustrated in FIG. 4, the future vehicle state estimation unit 12 uses an observer to calculate the future vehicle state. To the future vehicle state estimation unit 12 formed of the observer, there are input a road surface displacement z0 based on the time array data w(t) and the vehicle characteristic information, for example, the vehicle body weight (vehicle body mass mb). The vehicle body weight is used to solve a state equation given by Expression 3.

Figure 7:
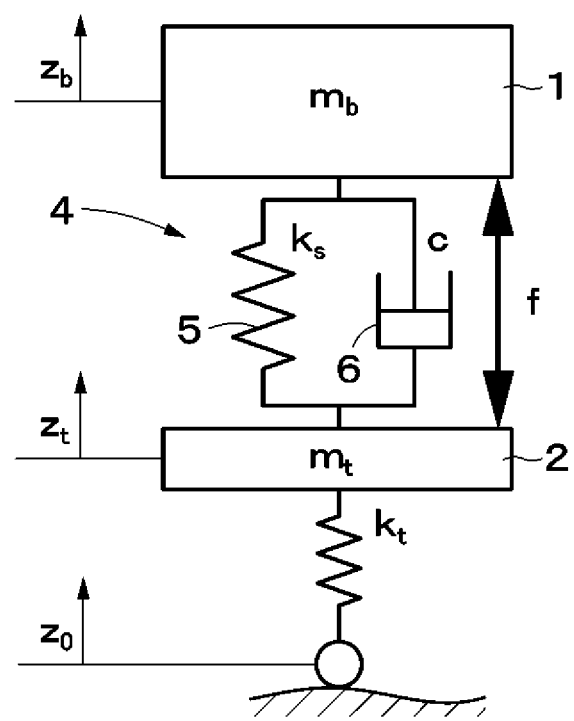
FIG. 7 is a schematic diagram for illustrating a vehicle model to be used to estimate a future vehicle state.

The future vehicle state estimation unit 12 forms a vehicle sprung behavior prediction unit. The future vehicle state estimation unit 12 predicts the sprung behavior of the vehicle from the road surface displacement (detected road surface displacement) acquired from the camera device 8. Specifically, the future vehicle state estimation unit 12 estimates the future vehicle state exhibited when the vehicle travels on the road surface measured by the camera device 8 based on a vehicle model illustrated in FIG. 7. In FIG. 7, there is exemplified the case in which one set of the suspension device 4 is provided between the vehicle body 1 and the wheel 2. However, for example, the total of four sets of the suspension devices 4 are individually and independently provided between the four wheels 2 and the vehicle body 1, and only one thereof is schematically illustrated in FIG. 7.

An absolute vertical displacement of the vehicle body 1 is represented by "zb", an absolute vertical displacement of the unsprung portion is represented by "zt", the absolute vertical displacement (detected road surface displacement) of the road surface is represented by "z0", the vehicle body mass is represented by "mb", an unsprung mass is represented by "mt", the spring constant between the vehicle body 1 and the unsprung portion is represented by "ks", the tire spring constant is represented by "kt", a damper attenuation coefficient is represented by "c", and a control force acting between the vehicle body and the unsprung portion is represented by "f".

In this case, when a relative displacement between the sprung portion and the unsprung portion is represented by "zbt", and a relative displacement between the unsprung portion and the road surface is represented by "zt0", the relative displacements "zbt" and "zt0" and the state equation are given by Expression 3 to Expression 5. In the state equation, a state variable "x" and an output "y" are given by Expression 6 and Expression 7. The dot of the expression means first-order differentiation (d/dt) with respect to the time "t". When the number of dots is two, the two dots mean second-order differentiation ($d^2/dt^2$).

$$z_{bt} = z_b - z_t \quad \text{[Expression 3]}$$

$$z_{t0} = z_t - z_0 \quad \text{[Expression 4]}$$

$$\dot{x} = Ax + Bu + Gw$$

$$y = Cx + Du \quad \text{[Expression 5]}$$

$$x = [\dot{z}_b, \dot{z}_{bt}, \dot{z}_{t0}, \dot{z}_{t0}] \quad \text{[Expression 6]}$$

$$y = [\ddot{z}_b, \dot{z}_b, \ddot{z}_t, \dot{z}_t] \quad \text{[Expression 7]}$$

It is assumed that an external force "u" acting between the vehicle body 1 and the unsprung portion is the control force "f" (u=f), and disturbance "w" is the detected road surface displacement "z0" (w=z0). Moreover, each of elements of the state equation is given by Expression 8.

$$A = \begin{bmatrix} 0 & 1 & 0 & -1 \\ -\dfrac{k_s}{m_b} & -\dfrac{c}{m_b} & 0 & \dfrac{c}{m_b} \\ 0 & 0 & 0 & 1 \\ -\dfrac{k_s}{m_t} & \dfrac{c}{m_t} & -\dfrac{k_t}{m_t} & -\dfrac{c}{m_t} \end{bmatrix},$$ [Expression 8]

$$B = \begin{bmatrix} 0 \\ \dfrac{1}{m_b} \\ 0 \\ -\dfrac{1}{m_t} \end{bmatrix},$$

$$G = \begin{bmatrix} 0 \\ 0 \\ -1 \\ 0 \end{bmatrix},$$

$$C = \begin{bmatrix} -\dfrac{k_s}{m_b} & -\dfrac{c}{m_b} & 0 & \dfrac{c}{m_b} \\ 0 & 1 & 0 & 0 \\ -\dfrac{k_s}{m_t} & \dfrac{c}{m_t} & -\dfrac{k_t}{m_t} & -\dfrac{c}{m_t} \\ 0 & 0 & 0 & 1 \end{bmatrix},$$

$$D = \begin{bmatrix} \dfrac{1}{m_b} \\ 0 \\ -\dfrac{1}{m_t} \\ 0 \end{bmatrix}$$

When the variable damper 6 is formed of a device configured to directly apply a force to the vehicle body 1, for example, an active suspension, it is possible to obtain a future vehicle state including a future sprung speed, a future unsprung speed, and a future relative speed based on Expression 3.

Meanwhile, when the variable damper 6 is formed of, for example, a semi-active suspension, a bilinear system can be used. In the state equation given by Expression 3, the control force "f" is used, but the input is treated as an attenuation coefficient "uc" in the case of the bilinear system. This case is described by a state equation given by Expression 9. Thus, it is possible to obtain the future vehicle state including the future sprung speed, the future unsprung speed, and the future relative speed based on Expression 9.

$\dot{x} = Ax + Bx^* u_{c} + Gw$ [Expression 9]

Symbol x* represents a diagonal matrix including the state variable "x", and thus the control force "f" expressed by the attenuation coefficient input "uc" and a relative speed (dzb/dt−dzt/dt) is given by Expression 10. As a result, x* is given by Expression 11.

$f = -u_c(\dot{z}_b - \dot{z}_t)$ [Expression 10]

$x^* = (\dot{z}_b - \dot{z}_t)$ [Expression 11]

The command value calculation unit 13 forms a force generation mechanism control unit. The command value calculation unit 13 obtains a force (attenuation force) to be generated by the variable damper 6 based on the predicted value obtained by the future vehicle state estimation unit 12, and outputs a command signal (preview control command value). Specifically, the command value calculation unit 13 calculates a preview control command value (command value of the control force "f" or the attenuation coefficient "uc") that minimizes a future sprung speed V2 from the estimated sprung speed based on an evaluation function given by Expression 12. The sprung speed V2 used for the evaluation function is a future vehicle behavior estimated by the future vehicle state estimation unit 12 (observer). Moreover, a time $t_{preview}$ of an interval of integration of Expression 12 is an arrival time at the maximum distance that can be measured with the preview function, and is calculated by dividing the maximum detection distance by the vehicle speed. Thus, the evaluation function is an integrated value of the estimated vehicle state from the current position to the maximum detection distance of the own vehicle.

The integration interval may be reduced in order to consider a type of the preview function or to reduce a processing load. Moreover, a command timing of the control command value may be adjusted through use of a method of compensating for a delay amount in consideration of, for example, responsiveness of the actuator.

$J = \int_0^{t_{preview}} (V2) dt \rightarrow \min$ [Expression 12]

The vehicle behavior device according to this embodiment has the above-mentioned configuration. Description is now given of an operation thereof.

The camera device 8 provided in the front portion of the vehicle body 1 takes an image of the road surface state forward of the vehicle as the road surface preview information, and outputs the image of the road surface preview information to the controller 10. The controller 10 predicts a future vehicle state based on the information on the vehicle speed from the vehicle speed sensors 3, the information on the detected road surface displacement from the camera device 8, and the information on the vehicle weight from the vehicle height sensors 9. After that, the controller 10 obtains the command value (preview control command value) that minimizes the future sprung speed V2, and variably controls the damping force to be generated by each variable damper 6 based on this command value.

Figure 8:
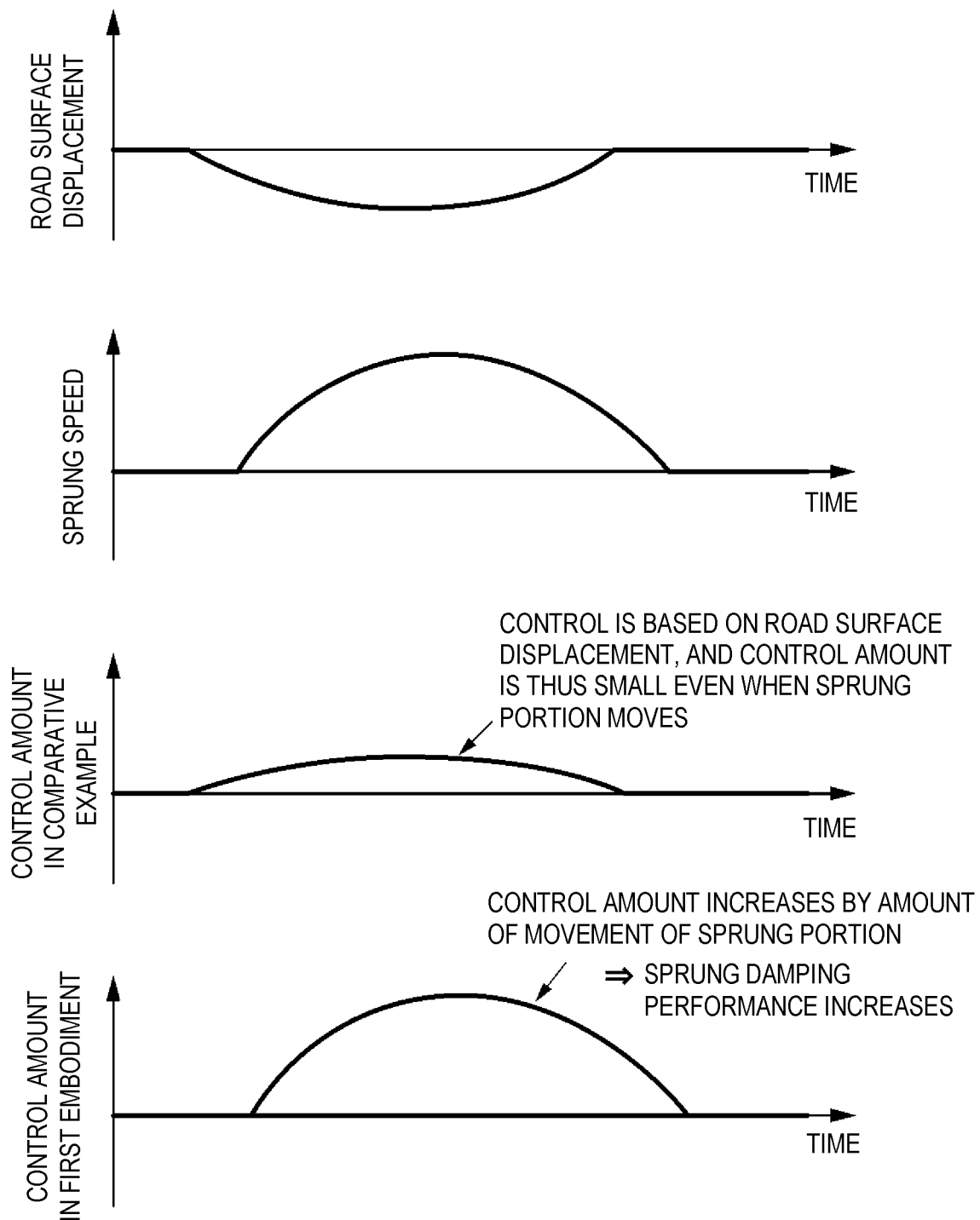
FIG. 8 is a characteristic graph for showing temporal changes in a sprung speed, a control amount in a comparative example, and a control amount in a first embodiment of the present invention which are exhibited when a road surface displacement at low frequency occurs.

In this configuration, the road surface displacement and the sprung speed do not always match. As shown in FIG. 8, for example, in a case of a tortuous road on which a low-frequency road surface displacement occurs, the sprung speed is larger than the road surface displacement. In this case, in a comparative example that controls the suspension devices based on the road surface displacement, a control amount becomes insufficient, and sprung vibration cannot fully be suppressed. In contrast, the controller 10 in this embodiment controls the suspension devices 4 so as to minimize the future sprung speed V2. Thus, even when the sprung speed larger than the road surface displacement occurs, the sprung vibration can fully be suppressed.

Figure 9:
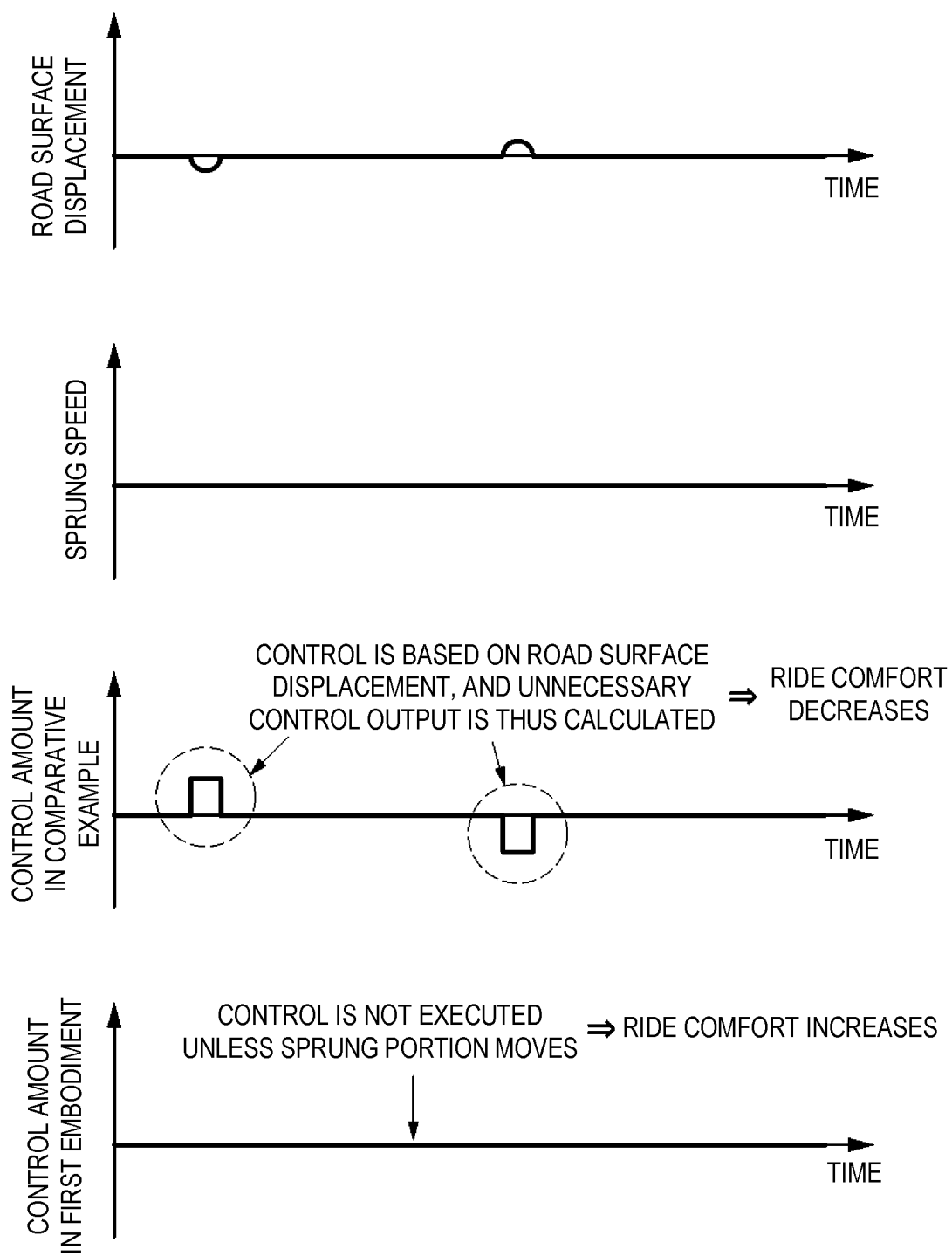
FIG. 9 is a characteristic graph for showing temporal changes in the sprung speed, the control amount in the comparative example, and the control amount in the first embodiment which are exhibited when a single recess and a single protrusion are present on the road surface.

Moreover, as shown in FIG. 9, when a single recess and a single protrusion (a single small protrusion) are present on the road surface, the sprung speed hardly changes. In this case, in the comparative example in which the suspension devices are controlled based on the road surface displacement, the control amount becomes excessive, and it is liable that the sprung vibration increases. In contrast, the controller 10 in this embodiment controls the suspension devices 4 so as to minimize the future sprung speed V2. Thus, the controller 10 does not output an unnecessary control amount. Consequently, compared with the comparative example, in this embodiment, ride comfort of the vehicle can be improved.

As a result, according to this embodiment, the vehicle behavior device includes the variable damper 6 (force generation mechanism), which is provided between the vehicle body 1 side and the wheel 2 side of the vehicle, and is configured to adjust the force to be generated, the camera device 8 (road surface state acquisition unit) configured to acquire the road surface state forward of the vehicle, the future vehicle state estimation unit 12 (vehicle sprung behavior prediction unit) configured to predict the sprung behavior of the vehicle from the detected road surface displacement acquired by the camera device 8, and the command value calculation unit 13 (force generation mechanism control unit) configured to obtain the force to be generated by the variable damper 6 based on the predicted value obtained by the future vehicle state estimation unit 12, and output the command signal. Moreover, the command value calculation unit 13 obtains, for the predicted value obtained by the future vehicle state estimation unit 12, an optimal command value for reducing the sprung behavior through use of the evaluation function.

As a result, this embodiment has superiority in the sprung vibration control at the sprung resonant frequency compared with a method of calculating the output of the preview control by multiplying the road surface displacement by a gain as in the related art. Thus, in this embodiment, compared with the related art, the sprung vibration can be suppressed, to thereby improve the ride comfort of the vehicle.

Moreover, the future vehicle state estimation unit 12 predicts the sprung behavior of the vehicle in consideration of the vehicle weight. Thus, it is possible to estimate the sprung behavior of the vehicle in accordance with the vehicle body weight, and it is thus possible to increase an effect of suppressing the sprung vibration compared with a case without the consideration of the vehicle weight.

Moreover, to the future vehicle state estimation unit 12, there is input the road surface displacement information in consideration of the vehicle speed. That is, when the vehicle speed is high, the frequency of the road surface displacement is large. When the vehicle speed is low, the frequency of the road surface displacement is small. Thus, the future vehicle state estimation unit 12 predicts the sprung behavior of the vehicle in consideration of the vehicle speed. As a result, a change in the road surface input frequency caused by the vehicle speed can be reflected to the state amount estimation through the vehicle model. Consequently, the change in the vehicle vibration caused by the change in vehicle speed can be estimated. As a result, it is possible to estimate the sprung behavior of the vehicle in accordance with the vehicle speed, and it is thus possible to increase the effect of suppressing the sprung vibration compared with the case without the consideration of the vehicle speed.

In the first embodiment, the future vehicle state estimation unit 12 uses the state equation to estimate the future vehicle state. In the case in which the state equation is used, when there is employed a highly precise vehicle model that considers various forces generated by the suspensions and other suspension modules, it is possible to use a multi-input/multi-output system. The present invention is not limited to this configuration, and when a simple one-input/out-output model is used to estimate the sprung speed, the estimation may be made through use of a transmission function or a map.

Moreover, the control command value is derived through use of the evaluation function, but the configuration is not limited to this example, and the control command value may be calculated through use of the skyhook control, the bilinear optimal control, or the like depending on the vehicle state calculated as given by Expression 5 or Expression 9. In this case, the delay of the actuator is considered, and an adjustment is made such that the timing of the actual behavior of the vehicle and the timing of the predicted behavior match each other.

Figure 10:
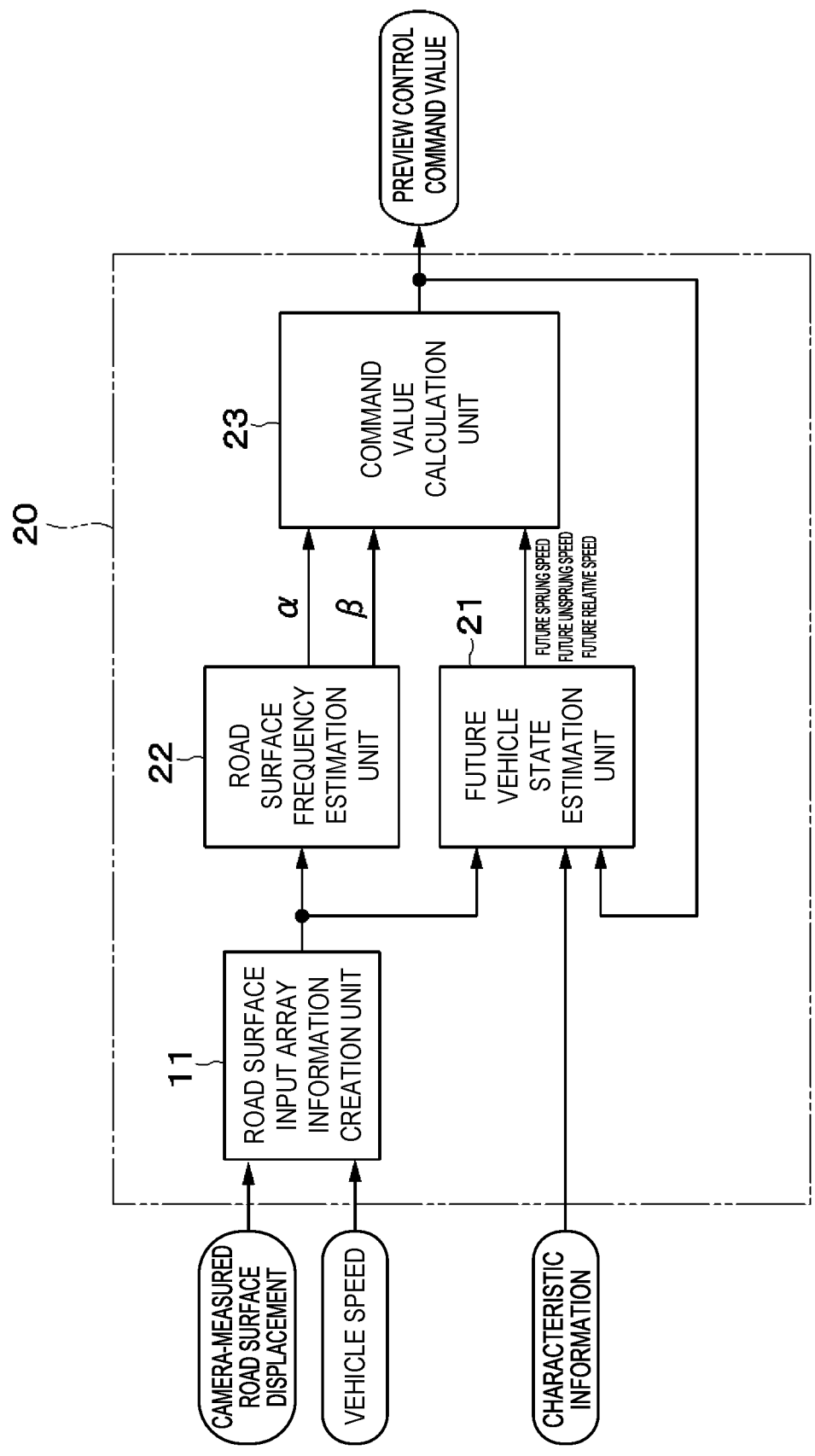
FIG. 10 is a control block diagram for illustrating a controller according to a second embodiment of the present invention.

FIG. 10 is an illustration of a second embodiment of the present invention. A feature of the second embodiment resides in that a command value calculation unit uses a future vehicle state, a sprung resonance frequency level (sprung resonance level) and an unsprung resonance frequency level (unsprung resonance revel) estimated from the road surface displacement information as input signals to an evaluation function, to thereby calculate optimal control command value. In the second embodiment, the same components are denoted by the same reference symbols as those of the first embodiment, and description thereof is omitted.

A controller 20 in the second embodiment is configured substantially similarly to the controller 10 in the first embodiment. The controller 20 is formed through use of, for example, a microcomputer. The controller 20 includes a memory 20A. To the controller 20, there are input the camera-measured road surface displacement, the vehicle speed, and the vehicle weight.

As illustrated in FIG. 10, the controller 20 includes the road surface input array information creation unit 11, a future vehicle state estimation unit 21, a road surface frequency estimation unit 22, and a command value calculation unit 23. The future vehicle state estimation unit 21 is the vehicle sprung behavior prediction unit, and is configured similarly to the future vehicle state estimation unit 12 in the first embodiment, and uses an observer to calculate the future vehicle state. The road surface frequency estimation unit 22 calculates a sprung resonance level a and an unsprung resonance level β estimated from the road surface displacement (preview road surface displacement).

The command value calculation unit 23 forms the force generation mechanism control unit. The command value calculation unit 23 uses the future vehicle state amount, the sprung resonance level a and the unsprung resonance level β estimated from the road surface displacement information as input signals to an evaluation function, to thereby calculate an optimal preview control command value (command value of control force "f" or the attenuation coefficient "uc"). Specifically, the command value calculation unit 23 calculates a preview control command value that minimizes a value J of an evaluation function given by Expression 13 from the estimated sprung speed and unsprung speed and the estimated sprung resonance level α and unsprung resonance level β based on the evaluation function. In this case, each of the sprung speed V2 and an unsprung speed V1 used for the evaluation function is a future vehicle behavior estimated by the future vehicle state estimation unit 12 (observer). Moreover, the time $t_{preview}$ of an interval of integration of Expression 13 is an arrival time at the maximum distance that can be measured with the preview function, and is calculated by dividing the maximum detection distance by the vehicle speed.

$$J=\int_0^{t_{preview}}(V2)dt \to \min \qquad \text{[Expression 13]}$$

As described above, also in the second embodiment, there can be provided substantially the same actions and effects as those in the first embodiment. Moreover, in the second embodiment, the command value calculation unit 23 obtains the optimal preview control command value in consideration of the sprung resonance level a and the unsprung resonance level β. As a result, it is possible to increase an effect of suppressing sprung vibration around the sprung resonant frequency and unsprung vibration around the unsprung resonant frequency.

Figure 11:
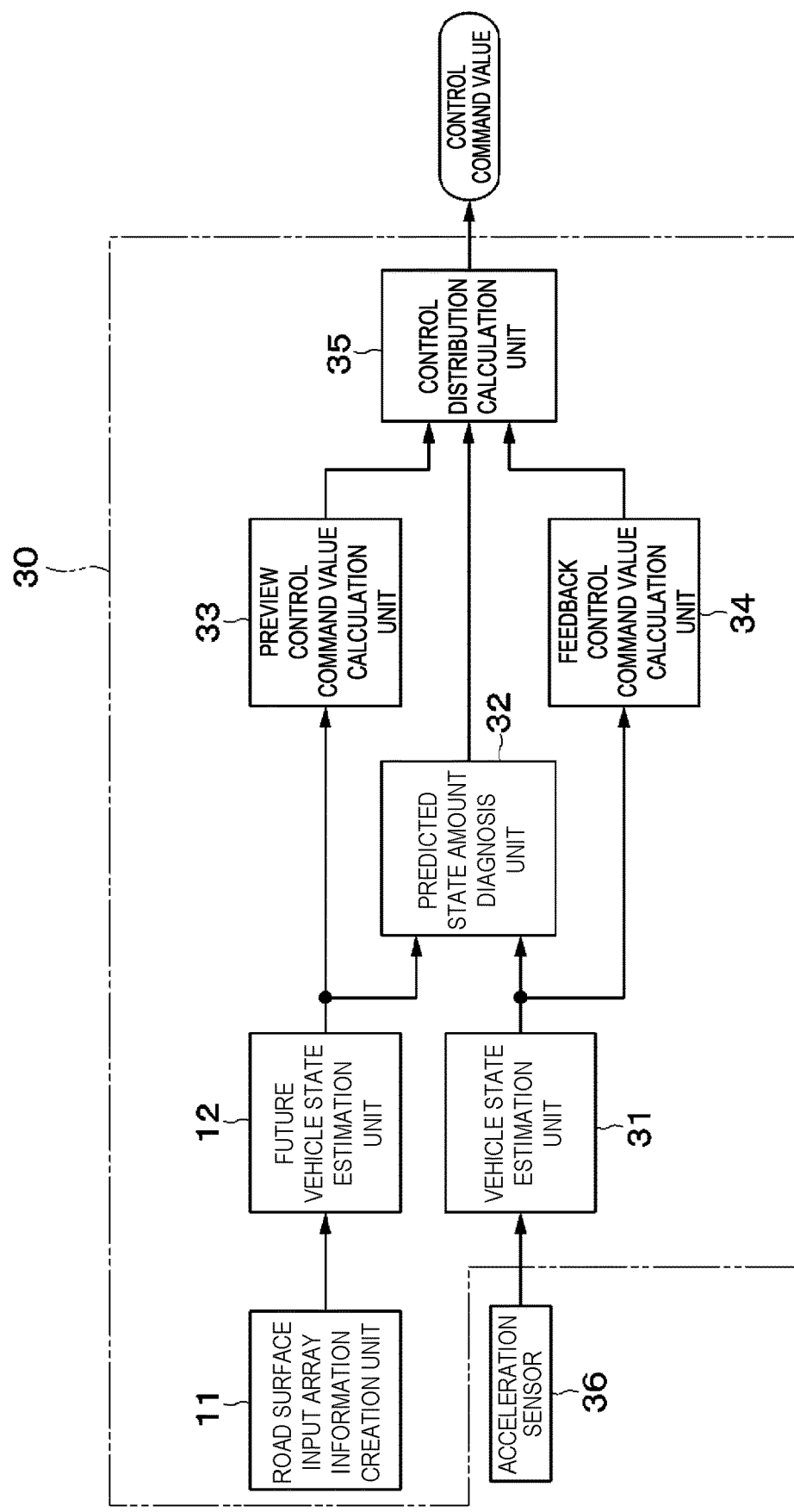
FIG. 11 is a control block diagram for illustrating a controller according to a third embodiment of the present invention.

FIG. 11 is an illustration of a third embodiment of the present invention. A feature of the third embodiment resides in that a command value for the preview control based on the future vehicle state and a command value for feedback control based on the current vehicle state are calculated, and the vehicle behavior is controlled based on those two command values. In the third embodiment, the same components are denoted by the same reference symbols as those of the first embodiment, and description thereof is omitted.

A controller 30 in the third embodiment is configured substantially similarly to the controller 10 in the first embodiment. The controller 30 is formed through use of, for example, a microcomputer. The controller 30 includes a memory 30A. To the controller 30, there are input the camera-measured road surface displacement, the vehicle speed, and the vehicle weight.

As illustrated in FIG. 11, the controller 30 includes the road surface input array information creation unit 11, the future vehicle state estimation unit 12, a vehicle state estimation unit 31, a predicted state amount diagnosis unit 32, a preview control command value calculation unit 33, a feedback control command value calculation unit 34, and a control distribution calculation unit 35.

To the vehicle state estimation unit 31, an acceleration sensor 36 configured to detect a current sprung acceleration is connected. The acceleration sensor 36 forms a vehicle state detection unit configured to detect the current vehicle state. The vehicle state estimation unit 31 estimates, for example, the sprung speed as a current vehicle state amount based on a detection signal from the acceleration sensor 36. The vehicle state detection unit is not limited to the acceleration sensor 36, and various sensors to be used for the suspension control, such as a vehicle height sensor and a wheel speed sensor, may be used to estimate the vehicle state amount.

To the predicted state amount diagnosis unit 32, there are input the future vehicle state (future sprung speed) and the current vehicle state obtained by the vehicle state estimation unit 31. In this configuration, the future vehicle state is estimated by the future vehicle state estimation unit 12. The predicted state amount diagnosis unit 32 executes calculation for delay processing, to thereby calculate the current vehicle state from the future vehicle state. The predicted state amount diagnosis unit 32 compares the current vehicle state calculated from the future vehicle state and the current vehicle state input from the vehicle state estimation unit 31 with each other. For example, when a difference between those two states (state amounts) is smaller than a predetermined value determined in advance for, for example, a certain period, the predicted state amount diagnosis unit 32 outputs a signal for allowing the preview control. When the difference between the two states is larger than the predetermined value for a certain period, the predicted state amount diagnosis unit 32 outputs a signal for inhibiting the preview control.

The preview control command value calculation unit 33 is configured similarly to, for example, the command value calculation unit 13 in the first embodiment. Thus, the preview control command value calculation unit 33 calculates the preview control command value that minimizes the future sprung speed from the future vehicle state (future sprung speed) based on the evaluation function.

The feedback control command value calculation unit 34 calculates a feedback control command value for controlling the vehicle behavior based on the current vehicle state. The feedback control command value calculation unit 34 calculates the feedback control command value as a control amount based on an existing vehicle behavior control algorithm, such as the skyhook control, the bilinear optimal control, and the model predictive control.

The control distribution calculation unit 35 forms, together with the preview control command value calculation unit 33 and the feedback control command value calculation unit 34, the force generation mechanism control unit. The control distribution calculation unit 35 selects any one of the preview control command value and the feedback control command value based on the signal output from the predicted state amount diagnosis unit 32, and outputs the selected control command value. In this case, when the preview control is allowed by the predicted state amount diagnosis unit 32, the control distribution calculation unit 35 outputs the preview control command value. When the preview control is inhibited by the predicted state amount diagnosis unit 32, the control distribution calculation unit 35 outputs the feedback control command value.

As described above, also in the third embodiment, there can be provided substantially the same actions and effects as those in the first embodiment. For example, it is conceivable that the preview function cannot normally measure the road surface due to a certain abnormality or an environmental factor (for example, a state in which it is difficult for the camera device 8 to take an image). In the third embodiment, the current vehicle vibration (sprung vibration) calculated from the future vehicle state and a current vehicle vibration based on the detection signal of the existing acceleration sensor 36 mounted to the vehicle are compared with each other, and when the future vehicle state estimation unit 12 outputs a value different by a predetermined value or more in a certain period, the vehicle behavior is controlled through use of the feedback control command value. As a result, even when the preview control is difficult, the vehicle behavior can be controlled in accordance with the current vehicle state.

The control distribution calculation unit 35 selects any one of the preview control command value and the feedback control command value. The present invention is not limited to this configuration, and the control distribution calculation unit 35 may change a control contribution ratio between the preview control command value and the feedback control command value based on a signal output from the predicted state amount diagnosis unit 32.

In this case, when the control distribution calculation unit 35 determines that the difference between the current vehicle state calculated from the future vehicle state by the predicted state amount diagnosis unit 32 and the current vehicle state input from the vehicle state estimation unit 31 is small, the control distribution calculation unit 35 increases the control contribution ratio of the preview control command value to the feedback control command value. Meanwhile, when the control distribution calculation unit 35 determines that the difference between the current vehicle state calculated from the future vehicle state by the predicted state amount diagnosis unit 32 and the current vehicle state input from the vehicle state estimation unit 31 is large, the control distribution calculation unit 35 increases the control contribution ratio of the feedback control command value to the preview control command value.

In each of the embodiments, the future vehicle state estimation unit 12 or 21 uses the vehicle weight acquired based on the detection signals from the vehicle height sensors 9 to estimate the future vehicle state. The present invention is not limited to this configuration, and, for example, an average vehicle weight may be stored in advance, and the future vehicle state estimation unit may use the stored vehicle weight to estimate the future vehicle state.

In each of the embodiments, the future vehicle state estimation unit 12 or 21 uses the detected road surface displacement in consideration of the vehicle speed to estimate the future vehicle state. The present invention is not limited to this configuration, and the future vehicle state estimation unit may use the detected road surface displacement without consideration of the vehicle speed (for example, the camera-measured road surface displacement) to estimate the future vehicle state.

In each of the embodiments, description is given with the exemplary case in which the force generation mechanism configured to generate the adjustable force between the vehicle body 1 side and the wheel 2 side is formed of the variable dampers 6 formed of hydraulic shock absorbers of the damping force adjustable type. However, the present invention is not limited to this example, and the force generation mechanism may be formed of, in addition to a fluid-pressure shock absorber, an air suspension, a stabilizer (kinetic suspension), an electromagnetic suspension, or the like.

In each of the embodiments, description is given with the exemplary case of the vehicle behavior device to be used for a four-wheeled vehicle. However, the present invention is not limited to this example, and can be applied to, for example, a two-wheeled vehicle or a three-wheeled vehicle, or a truck, a bus, or the like, which is a service vehicle or a transport vehicle.

Each of the embodiments is only an example, and it is apparent that the configurations described in different embodiments can be partially replaced or combined.

As the vehicle behavior device encompassed in the embodiments, for example, the following aspects are conceivable.

A vehicle behavior device according to a first aspect includes: a force generation mechanism, which is provided between a vehicle body side and a wheel side of a vehicle, and is configured to adjust a force to be generated; a road surface state acquisition unit configured to acquire a road surface state forward of the vehicle; a vehicle sprung behavior prediction unit configured to predict a sprung behavior of the vehicle from a road surface displacement acquired by the road surface state acquisition unit; and a force generation mechanism control unit configured to obtain a force to be generated by the force generation mechanism based on a predicted value obtained by the vehicle sprung behavior prediction unit, and to output a command signal.

According to a second aspect, in the first aspect, the force generation mechanism control unit is configured to obtain, for the predicted value obtained by the vehicle sprung behavior prediction unit, an optimal command value for reducing a sprung behavior through use of an evaluation function.

According to a third aspect, in the first or second aspect, the vehicle sprung behavior prediction unit is configured to predict the sprung behavior of the vehicle in consideration of vehicle characteristic information on the vehicle.

According to a fourth aspect, in the third aspect, the vehicle characteristic information includes any one of a vehicle weight, an unsprung weight, a tire spring constant, and a suspension spring constant.

According to a fifth aspect, in any one of the first to fourth aspects, the vehicle sprung behavior prediction unit is configured to predict the sprung behavior of the vehicle in consideration of a speed of the vehicle.

According to a sixth aspect, in any one of the first to fifth aspects, the vehicle sprung behavior prediction unit is configured to predict the sprung behavior of the vehicle based on road surface displacement information including a frequency and a displacement component.

According to a seventh aspect, in any one of the first to sixth aspects, the road surface state acquisition unit is a road surface state measurement unit configured to measure a road surface state forward of the vehicle.

According to an eighth aspect, in any one of the first to sixth aspects, the road surface state acquisition unit is configured to acquire a road surface state through use of communication from an outside of the vehicle.

Note that, the present invention is not limited to the embodiments described above, and includes further various modification examples. For example, in the embodiments described above, the configurations are described in detail in order to clearly describe the present invention, and the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-012341 filed on Jan. 28, 2019. All disclosed contents including Specification, Scope of Claims, Drawings, and Abstract of Japanese Patent Application No. 2019-012341 filed on Jan. 28, 2019 are incorporated herein by reference in their entirety.

REFERENCE SIGNS LIST

1 vehicle body, 2 wheel, 3 vehicle speed sensor (vehicle speed detection unit), 4 suspension device, 6 variable damper (force generation mechanism), 7 damping force variable actuator, 8 camera device (road surface state acquisition unit), 9 vehicle height sensor (vehicle body weight detection unit), 10, 20, 30 controller, 12, 21 future vehicle state estimation unit (vehicle sprung behavior prediction unit), 13, 23 command value calculation unit (force generation mechanism control unit), 33 preview control command value calculation unit, 34 feedback control command value calculation unit, 35 control distribution calculation unit

The invention claimed is:

1. A vehicle behavior device, comprising:
   a force generation mechanism, which is provided between a vehicle body side and a wheel side of a vehicle, and is configured to adjust a force to be generated;
   a road surface state acquisition unit configured to acquire a road surface state forward of the vehicle;
   a vehicle sprung behavior prediction unit configured to predict a sprung behavior of the vehicle from a road surface displacement acquired by the road surface state acquisition unit; and
   a force generation mechanism control unit configured to obtain a force to be generated by the force generation mechanism for reducing a vehicle sprung behavior such that a value of an evaluation function is minimized based on a predicted value obtained by the vehicle sprung behavior prediction unit, and to output a command signal.

2. The vehicle behavior device according to claim 1, wherein the force generation mechanism control unit is configured to obtain, for the predicted value obtained by the vehicle sprung behavior prediction unit, an optimal command value for reducing a sprung behavior.

3. The vehicle behavior device according to claim 1, wherein the vehicle sprung behavior prediction unit is configured to predict the sprung behavior of the vehicle in consideration of vehicle characteristic information on the vehicle.

4. The vehicle behavior device according to claim 3, wherein the vehicle characteristic information includes any one of a vehicle weight, an unsprung weight, a tire spring constant, and a suspension spring constant.

5. The vehicle behavior device according to claim 1, wherein the vehicle sprung behavior prediction unit is configured to predict the sprung behavior of the vehicle in consideration of a speed of the vehicle.

6. The vehicle behavior device according to claim 1, wherein the vehicle sprung behavior prediction unit is configured to predict the sprung behavior of the vehicle based on road surface displacement information including a frequency and a displacement component.

7. The vehicle behavior device according to claim 1, wherein the road surface state acquisition unit is a road surface state measurement unit configured to measure a road surface state forward of the vehicle.

8. The vehicle behavior device according to claim 1, wherein the road surface state acquisition unit is configured to acquire a road surface state through use of communication from an outside of the vehicle.

* * * * *